United States Patent
Kumar et al.

(10) Patent No.: US 7,913,181 B2
(45) Date of Patent: Mar. 22, 2011

(54) METHOD AND APPARATUS FOR MONITORING A POWER SYSTEM

(75) Inventors: Vivek Kumar, Bihar (IN); Hemanth Kumar A, Karnataka (IN); Chery Jose, Kerala (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/605,825

(22) Filed: Oct. 26, 2009

(65) Prior Publication Data

US 2010/0138771 A1 Jun. 3, 2010

(51) Int. Cl.
G06F 3/048 (2006.01)
G08B 5/00 (2006.01)

(52) U.S. Cl. .............. 715/772; 700/286; 340/815.4

(58) Field of Classification Search .......... 340/815.4; 715/772; 700/286; 345/440
See application file for complete search history.

(56) References Cited

U.S. PATENT DOCUMENTS

| | | | |
|---|---|---|---|
| 5,049,873 A | | 9/1991 | Robins et al. |
| 5,909,061 A | * | 6/1999 | Sasaki et al. ............. 307/44 |
| 6,003,508 A | * | 12/1999 | Hoffschmidt et al. ....... 126/680 |
| 6,882,904 B1 | * | 4/2005 | Petrie et al. ............... 700/286 |
| 2004/0030457 A1 | * | 2/2004 | Bayoumi et al. ........... 700/286 |
| 2004/0260404 A1 | | 12/2004 | Russell et al. |
| 2007/0124619 A1 | * | 5/2007 | Mizukami et al. ......... 713/323 |
| 2009/0216387 A1 | * | 8/2009 | Klein ........................ 307/39 |
| 2009/0231342 A1 | * | 9/2009 | Smith et al. ............... 345/440 |
| 2010/0043870 A1 | * | 2/2010 | Bennett et al. ............. 136/251 |
| 2010/0082171 A1 | * | 4/2010 | Takehara et al. ........... 700/286 |
| 2010/0138066 A1 | * | 6/2010 | Kong ........................ 307/19 |

FOREIGN PATENT DOCUMENTS

| | | |
|---|---|---|
| DE | 69534334 | 1/1994 |
| EP | 0457445 A2 | 11/1991 |
| EP | 0715435 A2 | 5/1996 |
| WO | 8907377 | 8/1989 |

OTHER PUBLICATIONS

U.S. Appl. No. 12/548,036, filed Aug. 26, 2009.

* cited by examiner

*Primary Examiner* — Eric M Blount
(74) *Attorney, Agent, or Firm* — Armstrong Teasdale LLP

(57) ABSTRACT

A power system includes a plurality of power generation units configured to generate power from a renewable energy source and a server that includes a display. The server is configured to establish a communication with the plurality of power generation units and display a status of the plurality of power generation units on the display.

19 Claims, 2 Drawing Sheets

METHOD AND APPARATUS FOR MONITORING A POWER SYSTEM

BACKGROUND OF THE INVENTION

The present application relates generally to power systems and, more particularly, to a method and apparatus for monitoring a power system.

Some known power systems convert solar energy into electrical energy. In some known solar power systems, a plurality of photovoltaic panels (also known as solar panels) are logically or physically grouped together to form an array of solar panels. The solar panel array generates electricity and transmits the energy to an electrical grid or other destination.

Some known solar panel arrays include a large number of solar panels and may occupy a large surface area. For example, a solar panel array capable of producing 80 megawatts (MW) of electricity may occupy more than 600 acres of land. The solar panels in a solar panel array may be coupled together to form a network. Such networks may facilitate obtaining data from the solar panels, such as an amount of electricity provided. However, one or more solar panels may experience a failure to communicate properly with the network. If such a failure occurs, a technician may be required to manually inspect the solar panel and/or the network. Due to the large amount of space that at least some known solar power systems use, such manual inspection may be time-consuming, inefficient, and/or expensive.

BRIEF DESCRIPTION OF THE INVENTION

In one embodiment, a power system is provided. The power system includes a plurality of power generation units configured to generate power from a renewable energy source and a server that includes a display. The server is configured to establish a communication with the plurality of power generation units and display a status of the plurality of power generation units on the display.

In another embodiment, a method for monitoring a power system having a display and at least one solar panel is provided. The method includes establishing a communication with the at least one solar panel and displaying a status of the at least one solar panel on the display.

In another embodiment, a solar panel network for use in a solar power system having a server and a display is provided. The solar panel network includes at least one solar panel, at least one controller communicatively coupled to the at least one solar panel, and at least one communication device communicatively coupled to the at least one controller. The at least one communication device is configured to transmit a status to the server.

DETAILED DESCRIPTION OF THE INVENTION

Figure 1:
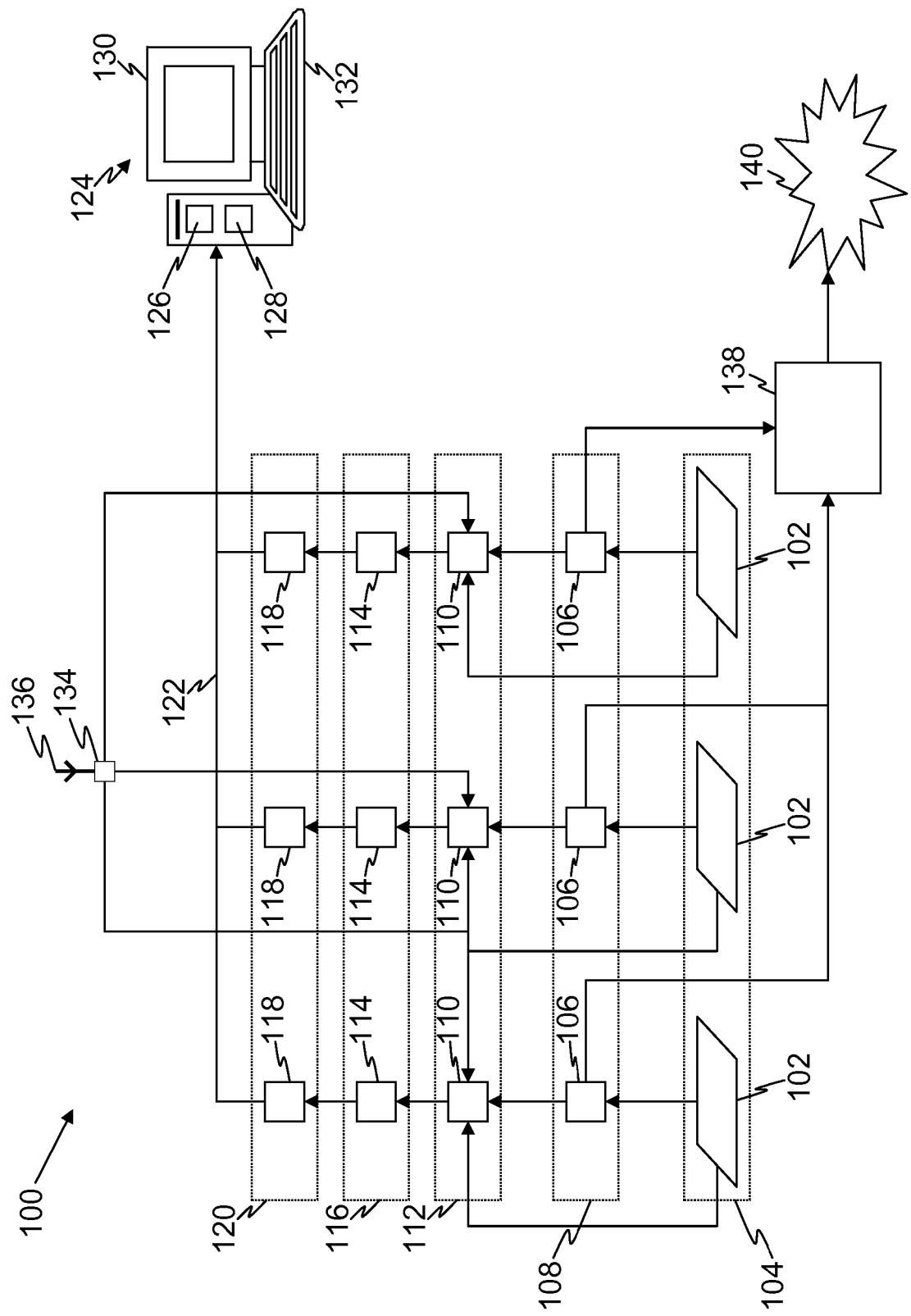
FIG. 1 is a block diagram of an exemplary solar power system.

FIG. 1 illustrates an exemplary power system 100 that includes at least one power generation unit, such as a solar panel 102. In the exemplary embodiment, power system 100 includes a plurality of solar panels 102 that form at least one solar panel array 104. Alternatively, power system 100 includes any suitable power generation units, such as a plurality of wind turbines, fuel cells, geothermal generators, hydropower generators, and/or other devices that generate power from renewable and/or alternative energy sources. As used herein, the term "renewable energy source" refers to an energy source that is naturally replenished. As used herein, the term "alternative energy source" refers to any energy source that is not derived from fossil fuels or nuclear fission or fusion. In the exemplary embodiment, power system 100 and/or solar panel array 104 includes any number of solar panels 102 to facilitate operating power system 100 at a desired power output. In one embodiment, power system 100 includes a plurality of solar panel arrays 104 coupled together in a series-parallel configuration to facilitate generating a desired current and/or voltage output from power system 100.

Solar panel 102 includes, in one embodiment, a photovoltaic panel, a solar thermal collector, or any other device that converts solar energy to electrical energy. In the exemplary embodiment, solar panel 102 includes a photovoltaic panel and solar panels 102 generate a substantially direct current (DC) power as a result of solar energy striking panels 102. In the exemplary embodiment, each solar panel 102 includes a unique identification number, such as, without limitation, a unique serial number. As used herein, a "unique" number refers to a number that is not duplicated by any other component within power system 100. In an alternative embodiment, each solar panel 102 includes an identification number that is not unique, such as, without limitation, a model number, a manufacturer number, and/or a number that indicates a component classification type.

Power system 100 includes at least one inverter 106. In the exemplary embodiment, power system 100 includes a plurality of inverters 106 that form at least one inverter array 108. Power system 100 and/or inverter array 108 includes any number of inverters 106 to facilitate operating power system 100 at a desired power output. In the exemplary embodiment, inverter array 108 is coupled to solar panel array 104, and, more specifically, at least one inverter 106 is coupled to at least one solar panel 102. In the exemplary embodiment, inverter 106 is coupled to a respective solar panel 102. Alternatively, a single inverter 106 is coupled to two or more solar panels 102. In the exemplary embodiment, inverters 106 facilitate converting a substantially DC power from solar panels 102 to a substantially alternating current (AC) power. In the exemplary embodiment, each inverter 106 includes a unique identification number, such as, without limitation, a unique serial number. In an alternative embodiment, each inverter 106 includes an identification number that is not unique, such as, without limitation, a model number, a manufacturer number, and/or a number that indicates a component classification type.

Power system 100 includes at least one controller 110. In the exemplary embodiment, power system 100 includes a plurality of controllers 110 that form at least one controller array 112. Power system 100 and/or controller array 112 includes any number of controllers 110 to facilitate operating power system 100 as described herein. In the exemplary embodiment, controller array 112 is coupled to inverter array 108 and solar panel array 104, and, more specifically, at least one controller 110 is coupled to at least one inverter 106 and to at least one solar panel 102. In the exemplary embodiment, each controller 110 is coupled to a respective inverter 106 and to a respective solar panel 102. Alternatively, a single controller 110 is coupled to two or more inverters 106 and/or two or more solar panels 102.

In one embodiment, controller 110 includes, without limitation, a processor, microprocessor, microcontroller, programmable logic controller (PLC), reduced instruction set computer (RISC), a programmable gate array (PGA), application specific integrated circuit (ASIC), and/or any other programmable circuit that enables power system 100 to operate as described herein. In the exemplary embodiment, controller 110 includes a PLC. Controller 110 facilitates gathering information from and/or controlling an operation of one or more components of power system 100. In the exemplary embodiment, each controller 110 includes a unique identification number, such as, without limitation, a unique serial number. In an alternative embodiment, each controller 110 includes an identification number that is not unique, such as, without limitation, a model number, a manufacturer number, and/or a number that indicates a component classification type.

Power system 100 includes at least one communication device 114. In the exemplary embodiment, power system 100 includes a plurality of communication devices 114 that form at least one communication device array 116. Power system 100 and/or communication device array 116 include any number of communication devices 114 to facilitate operating power system 100 as described herein. In the exemplary embodiment, communication device array 116 is coupled to controller array 112, and, more specifically, at least one communication device 114 is coupled to at least one controller 110. In the exemplary embodiment, each communication device 114 is coupled to a respective controller 110. Alternatively, a single communication device 114 is coupled to two or more controllers 110. In the exemplary embodiment, communication devices 114 facilitate communicatively coupling one or more components of power system together via a network 122.

Communication device 114 may include, without limitation, a network interface controller (NIC), a network adapter, a transceiver, or any other communication device that enables power system 100 to operate as described herein. In one embodiment, communication device 114 is integrated within controller 110. In the exemplary embodiment, communication device 114 is a separate component from controller 110, and device 114 is communicatively coupled to controller 110 and network connector 118. Each communication device 114 includes a unique identification number, such as, without limitation, a unique media access control (MAC) address and/or a unique serial number. In an alternative embodiment, each communication device 114 includes an identification number that is not unique, such as, without limitation, a model number, a manufacturer number, and/or a number that indicates a component classification type.

Power system 100 includes at least one network connector 118. In the exemplary embodiment, power system 100 includes a plurality of network connectors 118 that form at least one network connector array 120. Power system 100 and/or network connector array 120 include any number of network connectors 118 to facilitate operating power system 100 as described herein. In the exemplary embodiment, network connector array 120 is coupled to communication device array 116, and, more specifically, at least one network connector 118 is coupled to at least one communication device 114. In the exemplary embodiment, each network connector 118 is coupled to a respective communication device 114. Alternatively, a single network connector 118 is coupled to two or more communication devices 114.

In one embodiment, network connector 118 includes, without limitation, a network bridge, switch, hub, repeater, router, or any other suitable device that facilitates communicatively coupling one or more components of power system 100 and/or segments of network 122 together. In the exemplary embodiment, network connector 118 includes a wired Ethernet switch. In an alternative embodiment, network connector 118 includes a wireless Ethernet switch. In the exemplary embodiment, each network connector 118 includes a unique identification number, such as, without limitation, a unique serial number and/or a unique MAC address. In an alternative embodiment, each network connector 118 includes an identification number that is not unique, such as, without limitation, a model number, a manufacturer number, and/or a number that indicates a component classification type.

Communication devices 114 are communicatively coupled to network 122 via network connectors 118. Communication device 114 may be configured to connect to network 122 using any suitable communication protocol. In the exemplary embodiment, network 122 and communication device 114 use the same communication protocol, such as an IEEE 802.3 wired Ethernet protocol or a wireless Ethernet protocol, such as, without limitation, an IEEE 802.11 protocol, an IEEE 802.15 protocol, and/or an IEEE 802.16 protocol. In an alternative embodiment, network 122 and communication device 114 use different protocols, and network connector 118 facilitates a bidirectional translation of the protocol used by communication device 114 and the protocol used by network 122.

In the exemplary embodiment, a server 124 is communicatively coupled to network 122. Server 124 includes at least one processor 126, at least one memory 128, at least one display 130, and at least one user interface 132. Server 124 facilitates monitoring and/or controlling one or more components of power system 100. In an alternative embodiment, a plurality of servers 124 is communicatively coupled to network 122.

Processor 126 is coupled to memory 128, to display 130, and to user interface 132. In the exemplary embodiment, processor 126 includes a microprocessor. In an alternative embodiment, processor 126 includes a microcontroller, PLC, RISC, PGA, ASIC, and/or any other suitable programmable circuit that enables power system 100 to operate as described herein.

Memory 128 includes, without limitation, a computer readable medium, such as a hard disk drive, a solid state drive, a diskette, a flash drive, a compact disc, a digital video disc, and/or random access memory (RAM). Display 130 includes a liquid crystal display (LCD), a cathode ray tube (CRT), a plasma display, and/or any other suitable type of visual output device capable of displaying graphical data and text to a user. User interface 132 may include, without limitation, a keyboard, a keypad, a mouse, a pointing device, a touch sensitive screen, and/or an audio input device.

Power system 100 includes at least one meteorological tower 134 that includes at least one meteorological sensor 136. Meteorological sensor 136 is communicatively coupled to at least one controller 110. In an alternative embodiment, meteorological sensor 136 is communicatively coupled to server 124. Meteorological sensor 136 is configured to detect and/or monitor at least one meteorological condition at or proximate power system 100. For example, and without limitation, meteorological sensor 136 is configured to detect a temperature, wind speed, humidity, atmospheric pressure, and/or amount of sunlight at or proximate power system 100.

In the exemplary embodiment, power system 100 includes at least one substation 138 coupled to an electrical grid 140; inverters 106 transmit AC power to substation 138. Substation 138 conditions the AC power, such as by adjusting a voltage, a current, and/or a frequency of the AC power, and substation 138 transmits the AC power to electrical grid 140.

During operation, solar energy is absorbed by solar panels 102 that convert the solar energy to DC electrical power and transmit the DC power to inverters 106. Inverters 106 convert the DC power to a substantially AC power, and transmit the AC power to substation 138. Substation 138 conditions the AC power to suit the characteristics of electrical grid 140, and transmits the AC power to grid 140. In the exemplary embodiment, controllers 110 control an operation of inverters 106 and/or solar panels 102, such as, without limitation, by adjusting one or more power output characteristics of inverters 106 and/or adjusting a positional angle of solar panels 102. Controllers 110 communicate with each other and/or with server 124 via communication devices 114 and/or network connectors 118.

In the exemplary embodiment, server 124 monitors and/or controls an operation of power system 100. More specifically, server 124 receives data from controllers 110, solar panels 102, and/or other components of power system 100. Server 124 stores the data in memory 128 and/or displays the data on display 130. Moreover, server 124 transmits one or more commands to controllers 110 and/or to other components of power system 100. Such commands may include, without limitation, commands to energize or de-energize one or more components, and/or commands to modify an operating condition of one or more components.

Figure 2:
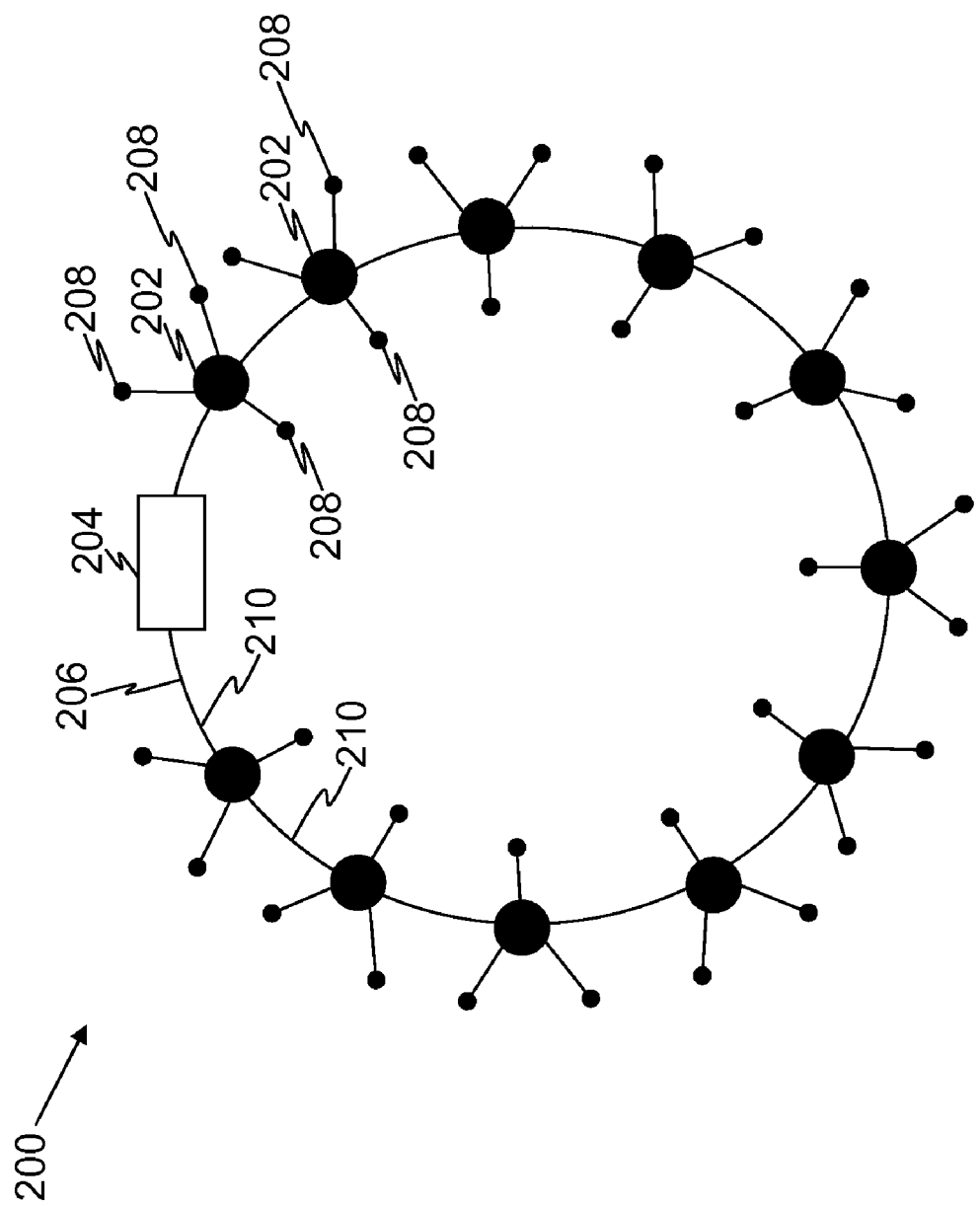
FIG. 2 is a block diagram of an exemplary computer-generated model of the solar power system shown in FIG. 1.

FIG. 2 illustrates a computer-generated model 200 of a portion of power system 100 (shown in FIG. 1). Model 200 includes a plurality of node icons 202 coupled to a server icon 204 via a network icon 206. Each node icon 202 includes at least one node element icon 208. Adjacent node icons 202 are coupled together via a plurality of network segment icons 210.

In the exemplary embodiment, model 200 represents a status, such as a connectivity status, of components of power system 100. As used herein, the term "status" refers to a communication state, a connectivity state, and/or any suitable state of operation of one or more components. The status may also include, without limitation, a network usage, a number of network and/or data packets received and/or transmitted, a communication latency, of one or more components. In the exemplary embodiment, model 200 is generated by server 124 (shown in FIG. 1) and is viewable on display 130 (shown in FIG. 1) and/or on a remote device display (not shown) coupled to server 124. Moreover, a user manipulates and/or gathers information from model 200 using user interface 132 (shown in FIG. 2) and/or a remote device interface (not shown) coupled to server 124.

In the exemplary embodiment, each node icon 202 represents a solar panel 102 (shown in FIG. 1). In an alternative embodiment, each node icon 202 represents a group of solar panels 102 and/or a solar panel array 104 (shown in FIG. 1). In another embodiment, each node icon 202 represents an inverter 106, a controller 110, a communication device 114, and/or a network connector 118 (all shown in FIG. 1), and/or another component of power system 100.

In the exemplary embodiment, server icon 204 represents server 124 and, more specifically, a status of server 124. Moreover, server icon 204 may also represent a status of electrical grid 140 (shown in FIG. 1) and/or a status of a connection between power system 100 and electrical grid 140. Alternatively, the status of electrical grid 140 and/or power system 100 may be shown using a different icon (not shown). In the exemplary embodiment, network icon 206 represents network 122 (shown in FIG. 1) and, more specifically, a status of network 122. Each node element icon 208 represents an associated component of a solar panel 102. More specifically, each node element icon 208 represents an inverter 106, a controller 110, a communication device 114, and/or a network connector 118 coupled to or otherwise associated with a respective solar panel 102. In an alternative embodiment, each node element icon 208 represents another component or a group of components of power system 100. In the exemplary embodiment, each network segment icon 210 represents a segment of network 122, for example, a segment that couples one node icon 202 to an adjacent node icon 202, and/or a segment of network 122 that couples server icon 204 to an adjacent node icon 202. While network segment icons 210 are illustrated in a ring configuration, this is for convenience only. Network 122 may be configured and/or displayed in any suitable arrangement of network segment icons 210, and is not limited to a ring network topology.

During operation, server 124 determines which components are coupled to network 122. Server 124 transmits one or more identification and/or communication requests to all components via network 122, using a broadcast protocol or other suitable protocol. Each component that is coupled to network 122 and that is operating correctly transmits one or more responses to server 124. Server 124 thus establishes a communication with each responsive component that is coupled to network 122. Server 124 generates a list and/or a database of components based on data received in response to the one or more identification requests and populates model 200 with icons corresponding to the components. In the exemplary embodiment, server 124 identifies each component via a unique identification number of each component. Alternatively, if a component does not have a unique identification number, server 124 identifies the component via a component type, a sequential number, a pseudorandom number, and/or any other suitable identification number.

In the exemplary embodiment, server 124 determines a status of each component of power system 100 that is coupled to network 122 by transmitting one or more status requests to each component. In one embodiment, server 124 transmits the status requests at fixed time intervals. In the exemplary embodiment, server 124 transmits the status requests at configurable time intervals. More specifically, server 124 transmits a first status request to each component that is coupled to network 122. Server 124 monitors a speed at which each component responds to the status request. Based on the response speed of each component, server 124 adjusts a time interval for transmitting a second status request to each component. For example, in one embodiment, server 124 may increase a time interval due to a slow response from a component, and may decrease a time interval due to a fast response from a component. It should be understood that, as different components may exhibit different response times, server 124 may establish different time intervals for each component. After waiting for the time interval to elapse, server 124 transmits the second status request. Additional status requests may be transmitted in a similar fashion.

In the exemplary embodiment, server 124 stores the responses to the status requests that are transmitted by each component of power system 100. In the exemplary embodiment, server 124 stores the responses in memory 128 (shown in FIG. 1). In an alternative embodiment, server 124 stores the responses in an alternate memory location, such as a network-attached storage device (not shown) or other remote memory device. In the exemplary embodiment, server 124 also gathers and stores additional data relating to a communication status of components of power system 100. For example, without limitation, server 124 gathers data regarding a number of status requests transmitted to each component, a number of status responses received from each component, a response time for each status response from each component, an amount of data transmitted by each component and/or a network bandwidth usage of each component. Server 124 stores such data in memory 128, and/or in a remote memory device.

In the exemplary embodiment, server 124 associates data from each component with a unique identification number of the component, such as the unique identification number of communication device 114 and/or the unique identification number of controller 110 described above. Moreover, server 124 associates the data from each component with that component's icon. For example, server 124 associates a response time for a controller 110 with the node element icon 208 of that controller 110, such that the response time for the controller 110 may be retrieved and/or displayed as desired.

In the exemplary embodiment, a user retrieves the data stored by server 124. For example, a user utilizes user interface 132 to select a node icon 202, server icon 204, network icon 206, node element icon 208, and/or a network segment icon 210 to retrieve data associated therewith. When the icon is selected, some or all of the data associated with the icon may be displayed in model 200. Alternatively, some or all of the data stored by server 124 may be displayed in model 200 automatically, and/or without user interaction. Additionally or alternatively, the user may use a remote interface (not shown), such as an internet application or a web page, to retrieve the data stored by server 124 and/or to manipulate node icon 202, server icon 204, network icon 206, node element icon 208, and/or network segment icon 210.

In the exemplary embodiment, server 124 indicates a status, such as a communication status, of components, such as solar panels 102, represented by node icons 202 in model 200. More specifically, server 124 indicates whether solar panels 102 are communicatively responsive to status requests sent by server 124. In the exemplary embodiment, server 124 indicates a status of each solar panel 102 by applying a predetermined coloring to each respective node icon 202. If a communication status of a solar panel 102 changes, server 124 changes the color of the associated node icon 202 appropriately. For example, in one embodiment, server 124 applies a substantially red coloring to each node icon 202 to indicate a communication failure, and a substantially green coloring to each node icon 202 to indicate a successful communication with each solar panel 102. Alternatively or additionally, server 124 indicates a communication status of each solar panel 102 by applying a predetermined coloring to the respective network segment icon 210 that is coupled between each respective node icon 202 and server icon 204. In an alternative embodiment, server 124 applies different colorings to each node icon 202 to indicate a communication failure and/or a successful communication with each respective solar panel 102. In another embodiment, server 124 applies a shading or another suitable graphical representation of communication status, rather than a coloring, to each node icon 202 and/or each network segment icon 210.

In one embodiment, server 124 varies an intensity level of the colorings applied to each node icon 202 to further indicate a communication status of each solar panel 102. Server establishes a baseline brightness and/or shade of predetermined coloring that is applied to each node icon 202 to indicate a baseline response speed of each respective solar panel 102. Server 124 adjusts the brightness and/or shade of the predetermined coloring based on the response speed of each solar panel 102. More specifically, server 124 intensifies the brightness and/or the shade of the predetermined coloring applied to each node icon 202 to indicate a fast response speed of each respective solar panel 102. Server 124 diminishes the brightness and/or the shade of the predetermined coloring applied to each node icon 202 to indicate a slow response speed of each respective solar panel 102.

In the exemplary embodiment, a communication status of each component represented by a node element icon 208 is indicated in model 200 in a similar manner as is described above. In one embodiment, a controller 110 associated with each solar panel 102 forwards a status request from server 124 to each associated component represented by node element icons 208. Each component represented by node element icons 208 transmits a response to the status request, or in the event of a failure, does not transmit a response, to controller 110. Controller 110 forwards the response, or a message indicating a failure to respond, to server 124. Based on the response from each component, server 124 indicates a communication status of each component on model 200. It should be understood that one component associated with a solar panel 102 may exhibit a failure, while other components associated with the solar panel 102 may exhibit successful communication. Accordingly, server 124 may indicate that one node element icon 208 has failed to communicate, such as by coloring the icon 208 red, and may indicate that the other node element icons 208 of a node icon 202 are successfully communicating, such as by coloring the icons 208 green.

In the exemplary embodiment, if server 124 transmits a status request to a component of power system 100, and the component fails to respond or responds with a failure message, server 124 stores the failure information in memory 128. Server 124 may also generate an alarm in model 200, such as, without limitation, a visual and/or audio alarm. In one embodiment, the alarm includes displaying a "pop-up" window in model 200 that includes a notification of the failure. Additionally or alternatively, a user may receive the alarm and/or the failure notification on a remote device, such as, without limitation, a wireless device and/or a remote computer.

A technical effect of the systems and method described herein includes at least one of (a) monitoring a power system that includes a display and at least one solar panel, (b) identifying each solar panel of at least one solar panel, (c) establishing a communication with at least one solar panel, and (d) displaying a communication status of at least one solar panel on a display.

The above-described embodiments facilitate providing an efficient and cost-effective power system. The power system described herein facilitates providing an interconnected network of solar panels and associated components. The power system facilitates enabling a server to identify and monitor the components of the power system. The communication status and/or additional data of the components are facilitated to be graphically displayed on a server or other device. As such, a user may be able to more efficiently determine if a component has failed or is exhibiting communication problems. Moreover, the power system described herein facilitates reducing a need to physically inspect the power system and/or components thereof.

Exemplary embodiments of a power system are described above in detail. The method, system, and array are not limited to the specific embodiments described herein, but rather, components of the system and/or array and/or steps of the method may be utilized independently and separately from other components and/or steps described herein. For example, the method may also be used in combination with other power systems and methods, and is not limited to practice with only the power system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system comprising:
    a plurality of power generation units configured to generate power from a renewable energy source; and,
    a server comprising a display, said server configured to:
        establish a communication with said plurality of power generation units; and,
        display a status of said plurality of power generation units on said display, wherein the status includes at least one of a communication status, a network usage, and a communication latency of said plurality of power generation units.

2. A power system in accordance with claim 1, wherein said server is further configured to display a graphical representation of said plurality of power generation units on said display.

3. A power system in accordance with claim 2, wherein the graphical representation includes at least one coloring representing the status of said plurality of power generation units.

4. A power system in accordance with claim 3, wherein an intensity level of the at least one coloring representing the status of said plurality of power generation units is changed based on the status of said plurality of power generation units.

5. A power system in accordance with claim 1, wherein said server is further configured to transmit a first status information request to said plurality of power generation units.

6. A power system in accordance with claim 5, wherein said server is further configured to monitor a response time of the first status information request from said plurality of power generation units.

7. A power system in accordance with claim 6, wherein said server is further configured to wait an amount of time based on the response time of the first status information request before sending a second status information request to said plurality of power generation units.

8. A method for monitoring a power system having a display and at least one solar panel, said method comprising:
    establishing a communication with the at least one solar panel; and,
    displaying a status of the at least one solar panel on the display, wherein the status includes at least one of a communication status, a network usage, and a communication latency of the at least one solar panel.

9. A method for monitoring a power system in accordance with claim 8, further comprising assigning a unique identifier to the at least one solar panel.

10. A method for monitoring a power system in accordance with claim 8, wherein said displaying a status of the at least one solar panel further comprises displaying a graphical representation of the at least one solar panel on the display.

11. A method for monitoring a power system in accordance with claim 10, wherein the graphical representation includes at least one coloring representing the status of the at least one solar panel.

12. A method for monitoring a power system in accordance with claim 11, wherein an intensity level of the at least one coloring representing the status of the at least one solar panel is changed based on the status of the at least one solar panel.

13. A method for monitoring a power system in accordance with claim 8, wherein said method further comprises transmitting a first status information request to the at least one solar panel.

14. A method for monitoring a power system in accordance with claim 13, wherein said method further comprises monitoring a response time of the first status information request from the at least one solar panel.

15. A method for monitoring a power system in accordance with claim 14, wherein said method further comprises waiting an amount of time based on the response time of the first status information request before sending a second status information request to the at least one solar panel.

16. A solar panel network for use in a power system having a server and a display, said solar panel network comprising:
    at least one solar panel;
    at least one controller communicatively coupled to said at least one solar panel; and,
    at least one communication device communicatively coupled to said at least one controller, said at least one communication device configured to transmit a status to the server, wherein the status includes at least one of a communication status, a network usage, and a communication latency of said at least one solar panel.

17. A solar panel network in accordance with claim 16, further comprising at least one network connector coupled to said at least one communication device, wherein said at least one communication device is further configured to transmit a status of said at least one solar panel to the server using said at least one network connector.

18. A solar panel network in accordance with claim 16, wherein said solar panel array further comprises at least one inverter communicatively coupled to said at least one solar panel and to said at least one controller.

19. A solar panel network in accordance with claim 18, wherein said at least one communication device is configured to transmit a status of said at least one inverter to the server.

* * * * *